Patented Mar. 4, 1952

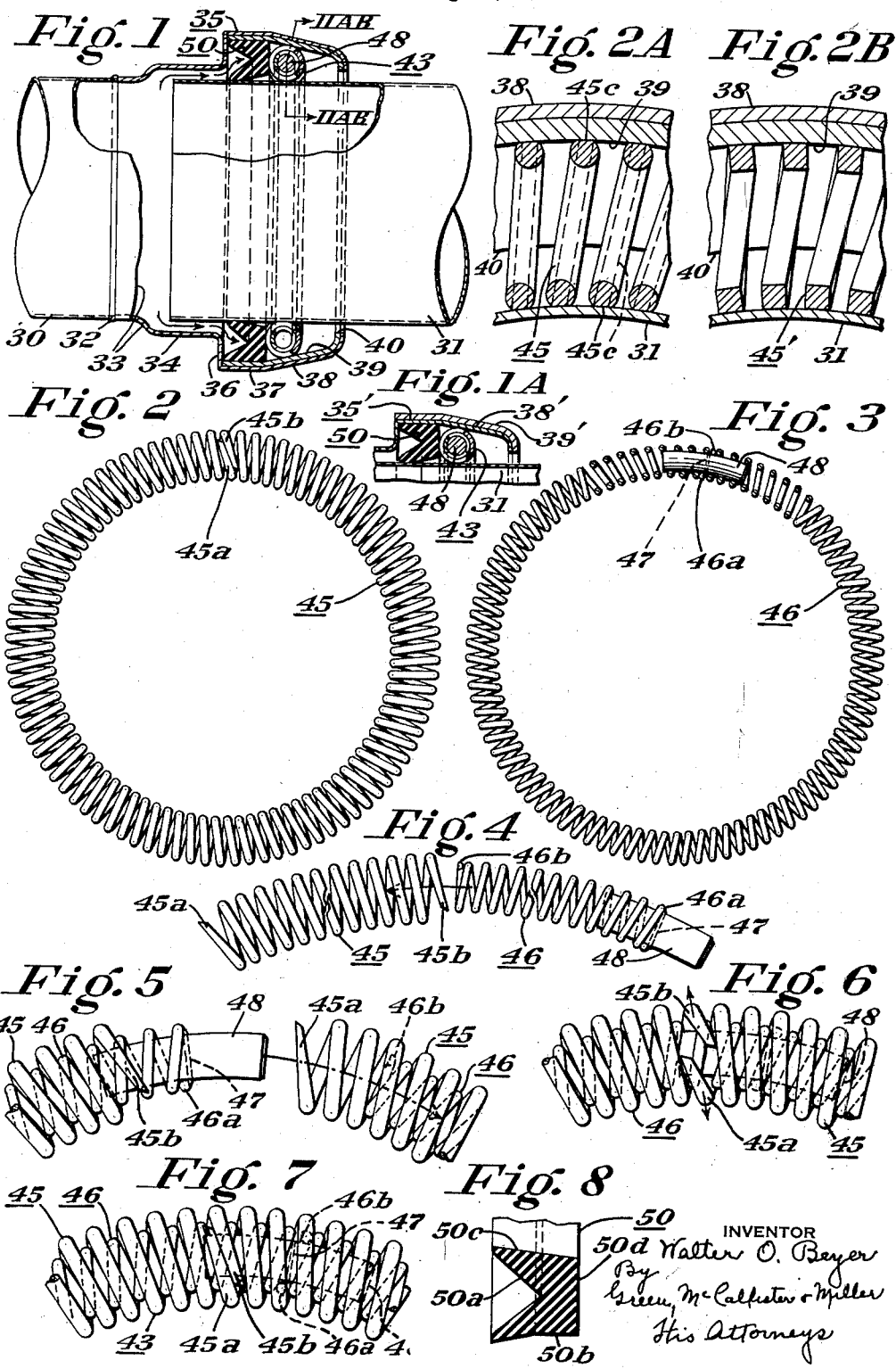

2,587,810

UNITED STATES PATENT OFFICE 2,587,810

SPRING GRIP PIPE COUPLING

Walter O. Beyer, Pittsburgh, Pa.

Application August 8, 1947, Serial No. 767,380

12 Claims. (Cl. 285—163)

1

This invention relates to coupling devices that are particularly suitable for closing off an end of a pipe or conduit section or for connecting a pair of adjacent conduit or pipe sections together. The invention is also applicable for providing a positive fluid seal between a coupling and pipe or conduit sections or members.

In Patent No. 2,259,453 entitled "Coupling Unit" of October 21, 1941, there is shown a coupling unit whose holding action is in accordance with an increase or decrease of fluid pressure, and particularly, of fluid pressure within a conduit or pipe. The present invention pertains to an improved form of coupling and to improved elements used in connection with a coupling which may be employed where fluid and/or mechanical pressures upon the conduit or pipe member or members are of a relatively high value.

Although the form of apparatus shown for the purpose of illustration in Figure 1 of the drawings employs a type of pressure washer element that is particularly suitable where the coupling is used for sealing off fluids, the present invention, and particularly, the portion thereof pertaining to grip elements and housing parts thereof may be utilized where the coupling is to be employed as a purely mechanical connector for shafting, etc.

My present invention involves features that provide a coupling with a higher initial holding force, based upon mechanical considerations, when fluid pressure is nihil or of a relatively low value. It also has features which make it particularly suitable for utilizations where a coupling unit is subjected to numerous types of stresses and separating forces, both when fluid pressure is low and when fluid pressure is at its maximum. In this connection, I have reference to such separating forces that may be exerted when a heavy or large line or conduit is laid over a path of irregular contour. The quick releasing action of the coupling of my above-mentioned patent is, however, retained and may be effected by turning a conduit section with respect to the coupling while exerting a separating force upon them. My present invention also provides an improved fluid pressure force translation.

It has thus been an object of my invention to provide a new and improved form of coupling and of parts therefor;

Another object has been to provide a form of coupling which is particularly suitable for high pressure utilizations;

A further object has been to provide a more efficient and effective coupling unit;

2

A still further object has been to provide improved elements in a coupling and to substantially broaden the field of utilization of couplings.

These and many other objects of my invention will appear to those skilled in the art from my specification, drawings, the description of the embodiments chosen for the purpose of illustration, and from the appended claims.

Figure 1 is a longitudinal view in partial section illustrating an embodiment of my invention;

Figure 1A is a fragmental longitudinal section of a modified form of housing wall;

Figure 2 is an enlarged side view in elevation of a detail of the embodiment of Figure 1 and showing an outer convoluted grip element in an articulated relation;

Figure 2A is a still further enlarged cross-sectional detail showing the form of grip or annulus element of Figure 2 in a mounted relationship with respect to a housing and a pipe member;

Figure 2B is a view similar to Figure 2A showing a modification; both Figures 2A and 2B are taken along the line IIAB—IIAB of Figure 1;

Figure 3 is a view similar to Figure 2, but showing an inner convoluted grip element in partial section;

Figure 4 is a somewhat diagrammatic fragmental side view, slightly enlarged over Figures 2 and 3, showing an initial step in a method of assemblying inner and outer elements of Figures 2 and 3; it will be noted that the two elements are provided with a pre-set curve, in order to give a substantially true annular form to an assembled coil unit, and in order to insure that the ends of each element will be in a properly aligned relationship or position for locking them together when, for example, the ends of the outer element are brought together, articulated, assembled, or interlocked to form a ring or annulus, see Figures 2 and 7;

Figure 5 is a still further enlarged fragmental exploded side view of two grip elements, illustrating how their ends are brought together in preparation for locking them in position to form an annulus combination;

Figure 6 is a view somewhat similar to Figure 5, but showing an outer convoluted element with its ends manually twisted in the direction of the arrows and in an adjacent relationship, as an intermediate step in assembling;

Figure 7 is a view somewhat similar to Figure 6, but showing a grip element combination in a finally assembled relationship; it also illustrates the interlocked or spacing relationship of sloped spring ends of the outer element when the twisting force has been removed;

Figure 8 is an enlarged cross-section through the pressure washer element of Figure 1, showing how it appears before assembly in a coupling unit.

The embodiment of my invention shown particularly in Figures 1 to 8, inclusive, is especially adapted for high pressure utilizations. That is, although a single locking annulus may be designed for successful operation in connection with pressures up to as high as approximately 800 pounds, I have determined that a dual annulus arrangement will provide an increased holding force and has particular value in connection with the utilization of fluid pressures of over 200 to 1000 pounds. This arrangement also is important where a greater holding action is desired when, for example, there is fluid pressure in the pipe line and considerable mechanical pull or tension on the pipe.

Although for the purpose of illustration, I have shown an inner annulus or holding element having a reverse hand with respect to the outer element, it will be apparent to those skilled in the art that both elements may have the same hand. I have determined that in extremely high pressure utilizations, the reversed hand relationship gives optimum or preferred results in that any tendency of the convolutions or turns of the outer annulus member or element to tilt or collapse under high pressure will be resisted to a maximum extent where the inner member or element has spaced convolutions that cross the spaced convolutions of the outer element to provide a maximum counterbalancing of such tendency. I have determined that the tendency of turns of a single annulus to collapse under extremely high pressures is principally due to the fact that turn segments on opposite sides of convolutions of an annulus turn where the annulus is formed by the same hand, in effect, lead in opposite directions. That is, the inner and outer limbs of a given turn lead off with opposite or opposed inclinations, but in the same direction with respect to a given side of the annulus.

Referring particularly to Figure 1, I have shown a pair of pipe sections or members 30 and 31 coupled together in a fluid sealed-off relationship. A coupling housing 35 is shown at one end provided with offset portions 36, 34, and 33. As shown, the portion 33 may be secured in any suitable manner, such as a butt weld 32, to the pipe 30, or thread-connected thereto, if desired.

A pressure washer, gasket, or fluid seal element 50 is shown positioned within the housing 35 ahead of a locking or grip element 45 or 45', or a combination of elements 43, with its pressure heel 50d, see Figure 8, in abutment with the latter. The arrows indicate the pressure flow of fluid to the inside of element 50. That is, the fluid being carried by the coupled pipe sections 30 and 31 enters the V-shaped or open chamber portion 50a and causes the element, and particularly its pressure heel 50d, to advance the annulus 45 or 45' or an assembly 43 along a converging or conic surface 39 of the coupling housing to progressively increase the holding action exerted thereby. This is effected by an actual reduction of diameter of the annulus as it moves towards the smaller portion of the conical envelope defined by the inside of the housing wall. It will be noted that the side 50b of the pressure element 50 is preferably beveled or of slightly greater diameter than an adjacent pipe section 31 for easy introduction of the pipe and to permit flowing movement of the body of element 50. Thus, if as preferred, the element 50 is of a non-compressible and free-flowing material such as rubber or a synthetic rubber-like plastic, the heel portion 50d will be free to advance substantially axially of the pipe 31 and to directly translate fluid (gas or liquid) pressure force into a mechanical pipe holding force.

For higher pressures, I prefer to reinforce the portions 37 and 38 of the coupling housing by an inner portion 39. It will be seen that the turned-in ends or edge portions 40 of the housing 35 are spaced from the pipe section 31 to permit suitable variations in alignment of the pipe and coupling. That is, the amount of spacing will depend upon the amount of permissible pivot action desired.

In Figure 1A, I have shown a modified coupling 35' in which an outer reinforcing portion 39' is employed about the primary housing portions, such as 38'.

It is believed where a combination grip element unit is employed, that the procedure for assembling the convoluted elements 45 and 46 in a concentrically assembled relationship with respect to each other is obvious from a study of the illustrations of Figures 4, 5, 6, and 7. If an inner annulus 46 is employed, it is preferably provided at one end 46a with a guide tip or plug 48 of curvilinear outline secured therein by any suitable means such as a weld 47, see Figure 4. The guide tip or plug 48 is adapted to slide or fit into the inner diameter of the outer end 46b of the inner spring or grip element 46.

Accordingly, the inner and outer elements 46 and 45, respectively, can thus be simultaneously connected at their opposite ends to provide a continuous annulus combination, see particularly Figures 5, 6, and 7. One spirally sloped end 45a of the outer element 45 is adapted to fit within a similarly spirally sloped end portion 45b at the other end of the same element. That is, the two ends of the spring 45 may be twisted in opposite directions, as shown in Figure 6, so that their ends 45a and 45b engage, when released, and fit together in the complementary relationship shown in Figures 2 and 7. The spacing between the turns or convolutions of each of the elements 45 and 46 may be proportioned to provide any desired holding action, as effected by progressive reduction of annulus diameters in proportion to a progressive fluid pressure increase.

It will also be apparent that the ends of the inner annulus 46 may be brought together in substantial alignment with the ends of the outer annulus 45, or preferably as shown, in any suitable offset position within the outer annulus. That is, I prefer to at least slightly offset the joined end relationship between the inner and outer annulus elements.

As line or fluid pressures involved become higher, I have also determined that a tangent point contact between the coil or annulus turns or convolutions and the surface of the pipe or tubing being held in position tends to produce a grooving of the contacted surface of the pipe, due to concentrated point or line pressure. There is also a similar effect on the inside surface of the housing that is in contact with the annulus. Although the housing can be case hardened, for example, to better withstand such a type of action, ordinarily it is disadvantageous to specially condition the pipe; that is, the coupling is preferably adaptable for use with any standard pipe section.

It will be apparent from my previous discussion that the opposed lead relationship of opposite sides of a given turn of an annulus will, under extremely high pressures, tend to produce a type of grooving that has a tendency to cause the turns of an annulus to collapse, tilt or canter, thus decreasing the holding action of the annulus.

I have determined, in accordance with another phase of my invention, where extremely high pressures are encountered, that the above so-called grooving action may be eliminated, or at least, substantially minimized, by grinding off or flattening the tangent points of contact 45c of the turns of the annulus, see Figure 2A. This gives an appreciably widened area of contact, eliminates grooving, and materially increases the range of pressures that may be successfully employed. I have also successfully used special shapes of wire for this purpose with highly beneficial results, for example, of flattened, substantially planar, or widened surface area sides, such as provided by a rectangular or square wire 45', see Figure 2B; in this figure, 45'c represents the contacting side surface.

The spacing between the turns of a given annulus, whether it is used as an outer annulus or an inner annulus of a combination, or as a single annulus, will be sufficient that contact between adjacent loops or turns of the annulus will be avoided for a maximum decrease in diameter of the annulus incident to the maximum line pressure that is involved. That is, as the line pressure increases, the grip annulus advances along the conic surface 39 or 38' of the coupling and its outer diameter tends to decrease. The gripping action is lessened when adjacent turns or loops of an annulus are forced into abutment or contact with each other. Thus, the spacing between the loops or turns of a given annulus will be determined by the strength characteristics of the material employed, by whether a single or combination annulus is used, and by the particular maximum pressures that are to be encountered in the pipe line to be coupled.

In Figure 8, I have shown a form of pressure gasket or washer element 50 that is particularly suited for higher pressures. It will be noted that one of its surfaces 50c, representing its outer periphery, has a substantially uniform inward slope from its lip edge toward its heel 50d (approximately 10° in this figure) and that its opposite surface 50b is offset or angular in shape and first slopes inwardly from its lip edge and then extends backwardly on a horizontal plane to the heel 50d. The sloped portion of the surface 50b that extends from its lip edge is approximately 10° (from the horizontal) in the figure and terminates substantially half the distance across the washer or sealing ring element 50. The slope of each side of the inner V, 50a, of the element 50 is approximately 42° (from the horizontal) in this figure. As shown in Figure 1, when the coupling parts are assembled, the surface 50c will rest in substantial abutment with an adjacent inner surface of the housing (adjacent the numeral 37 of Figure 1), while the front portion of the surface 50b will incline at an angle away from an adjacent surface, such as that of the pipe 31. The back ends of both surfaces 50b and 50c adjacent to the cut-out or chambered portion 50a of the washer, however, are shown in abutment with the inner surface of the housing 35 and the outer surface of the pipe 31. This permits the heel 50d to freely advance axially of the pipe sections without twisting or binding and provides a more effective application of fluid pressure forces upon the grip annulus.

The initial position of the element 50 with respect to the grip annulus 45 or combination 43 and adjacent portions of the housing 35 and 36 and pipe 31 influences the "at rest" or "no line pressure" holding action exerted by the grip element combination 43 or element 45. In Figure 1, it will be noted that the V-end edges of the washer and piston element 50 abut the ledge portion 36 of the housing, the adjacent side of the portion 50b and the side of 50c abut the housing and pipe surfaces, and the heel portion 50d abuts the grip element or elements. Figure 1 shows an initial relationship before full fluid pressure has been exerted.

It will appear that the coupling of my invention may be employed as a closure for a pipe or conduit section or member. In this connection, the coupling may be closed off by an end wall welded thereto at 32, see Figure 1.

When higher pressures are involved in a coupling employing a grip element having a spirally connected series of strut parts, I have determined that tangent point contact between the coil turns and adjacent surface portions of the housing and conduit will lead to grooving due to the concentrated point pressure. By grinding or flattening the turns or strut parts, I have determined that the surface area of contact is appreciably increased or widened to such an extent that grooving under high pressure conditions can be eliminated. Although I contemplate providing peripheral gripping surfaces of a grip annulus with widened surface portions, I also contemplate and prefer to provide the full length of convolutions of the grip annulus with at least one side portion of widened extent. The increased area of contact will also proportionately increase the holding or the effecting holding action of the grip element and it will thus be apparent that a grip element of the type such as illustrated, for example, in Figures 2A and 2B of the drawings can be of relatively smaller size and lesser strength than a corresponding element having a rounded, tangential line, or point contact with adjacent holding surfaces. Grooving also tends to decrease the effective diameter and the wall thickness of the housing or conduit. Since one side of a spiral element has a slope in a direction which is opposite to the slope on the opposite side thereof, a canting or tilting of turns successively is aided by a grooving action. Grooving also tends to hinder a full efficiency of translation of a separating force or forces into an effective member holding force or forces.

In accordance with my present invention, the mechanical holding action is effectively maintained, both under conditions of minimum or nihil and under conditions of maximum fluid pressure. And, such holding action is effective even when the pipe or conduit member has a pivoted or off-aligned relationship with the coupling or another pipe or conduit member to which it is connected by the coupling. The spacing of the edges 40 and wall portion 34 of the coupling with respect to the pipe or conduit member 31 is of a value sufficient to permit a suitable pivoting of the pipe with respect to the coupling, such that the assembly is adjustably flexible for variations in contour, etc.

As intimated above, the present invention contemplates the employment of either a single or a combination of inner and outer grip elements depending upon the particular requirements, the nature, strength, and type of the forces involved in the proposed utilization of the coupling. It will also appear that I have shown improved forms of elements which materially contribute individually and in combination to provide an improved coupling utilization. Those skilled in the art will appreciate that various revisions, omissions and additions may be made and utilized in connection with my present invention and in connection with the illustrated embodiments thereof without departing from the spirit and scope thereof as indicated by the appended claims.

What I claim is:

1. A coupling grip element of flexible spring-like construction having a plurality of normally spaced-apart convolutions shaped in the form of an annulus, said grip element being provided with interlocking end portions for holding said element in an articulated relationship, said convolutions having widened-surface gripping portions.

2. A coupling grip element as defined in claim 1 wherein, said interlocking end portions have a beveled contour to facilitate interlocking them with each other.

3. A coupling grip element as defined in claim 1 wherein, said convolutions are of substantially circular cross-section from the widened-surface gripping portions thereof.

4. A coupling grip element as defined in claim 1 wherein, said convolutions are of substantially rectangular cross-section inclusive of the widened surface gripping portions thereof.

5. In a coupling having a pair of annular members to be connected together, one of which is adapted to be positioned as a housing in a spaced-apart relationship about the other, the pair of members having opposed operating surfaces defining a converging annular spacing towards one end of the coupling; a flexible grip coil annulus adapted to be operatively positioned about the other member and between the opposed operating surfaces for movement towards the converging spacing, said annulus having integral convolutions defining a substantially continuous peripheral gripping surface therealong, and said gripping surface being substantially planar to provide a planar griping contact with the opposed operating surfaces.

6. In a coupling device for holding a member in position with respect to a housing wherein the housing and the member have opposed operating surfaces defining a converging spacing towards one end of the housing, a flexible grip coil annulus adapted to be operatively positioned about the member and within the housing between the opposed operating surfaces for movement towards the converging spacing, said grip annulus having integral and normally spaced-apart convolutions defining a substantially continuous peripheral gripping contact surface therealong, and said gripping contact surface defining a substantially flattened contact surface with the opposed operating surfaces of the housing and the member.

7. A device as defined in claim 6, wherein each convolution of said annulus is of substantially circular cross-section from the flattened contact surface thereof.

8. A device as defined in claim 6, wherein each convolution is of substantially rectangular cross-section inclusive of the flattened contact surface thereof.

9. A grip element assembly for a quick-release coupling which comprises, a primary grip annulus having pre-shaped normally spaced-apart convolutions provided with interlocking end portions, a secondary grip annulus having pre-shaped normally spaced-apart convolutions therealong and provided with interlocking end portions, the convolutions of said secondary annulus extending in a direction counter to the convolutions of said primary annulus to retain said secondary annulus substantially concentric with respect to said primary annulus when a radial force is applied to said primary annulus, the convolutions of said secondary annulus along its length having a diameter substantially corresponding to an inner spacing between convolutions of said primary annulus to resist a tilting of the convolutions of said primary annulus when the radial force is applied thereto, and the convolutions of said primary annulus having widened-surface gripping portions.

10. In a coupling device for holding a member in position with respect to a housing wherein the housing and the member have opposed operating surfaces defining a converging spacing towards one end of the housing, a flexible grip coil annulus adapted to be operatively positioned about the member and within the housing between the opposed operating surfaces for movement towards the converging spacing, said grip annulus having integral and normally-spaced-apart convolutions defining a substantially continuous peripheral gripping contact surface therealong, said gripping contact surface defining a substantially flattened contact surface with the opposed operating surfaces of the housing in the member, a secondary flexible coil annulus operatively positioned within said first-mentioned annulus to extend therealong, said secondary annulus having normally spaced-apart convolutions and interlocking end portions, the convolutions of said secondary annulus extending in a direction counter to the convolutions of said first-mentioned annulus, and said first-mentioned annulus having tapered-interlocking and spaced-apart ends twisted into an engaging relationship with respect to each other.

11. In a coupling having a pair of annular members to be connected together, one of which is adapted to be positioned as a housing in a spaced-apart relationship about the other, the pair of members having opposed operating surfaces defining a converging annular spacing towards one end of the coupling; an annular pressure sealing gasket operatively positioned about the other member and between the operating surfaces and having a pressure heel portion facing towards the converging spacing, said resilient gasket defining a fluid chamber towards an opposite end of the pair of members that is open to fluid flow through the members, said pressure heel portion having an inclined peripheral side wall converging outwardly in the direction of the converging spacing of the pair of members to facilitate movement of said gasket along the spacing therebetween, a flexible grip coil annulus operatively positioned about the other member and between the opposed operating surface of the pair of members for movement towards the converging spacing thereof, said annulus being positioned in a co-operative adjacency to the pressure heel portion of said gasket for actuation thereby, said annulus having integral convolutions defining a substantially continuous tangential gripping contact surface therealong in an operatively contacting relationship with respect to the opposed operating surfaces of the pair of members, said gripping surface being substantially flat thereacross to provide a planar gripping contact with the opposed operating surfaces of the pair of members.

12. In a coupling device for holding a member in position with respect to a housing wherein, the housing and the member have opposed operating surfaces defining a converging spacing towards one end of the housing, a flexible grip coil annulus to be operatively positioned about the member and within the housing between the opposed operating surfaces for movement towards the converging spacing, said grip annulus having an integral and normally spaced-apart convolutions, said convolutions having inner and outer peripheral portions that define widened-surface gripping portions to operatively engage the opposed operating surfaces of the housing and the member.

WALTER O. BEYER.

REFERENCES CITED

The following references are of record in the file of this patent:

UNITED STATES PATENTS

| Number | Name | Date |
|---|---|---|
| 119,254 | Vose | Sept. 26, 1871 |
| 428,215 | Leverick | May 20, 1890 |
| 1,240,170 | Block | Sept. 18, 1917 |
| 2,001,835 | Cook | May 21, 1935 |
| 2,184,376 | Beyer | Dec. 26, 1939 |
| 2,473,973 | Scheiwer | June 21, 1949 |

FOREIGN PATENTS

| Number | Country | Date |
|---|---|---|
| 447,127 | France | June 29, 1915 |
| 456,539 | Great Britain | Nov. 11, 1936 |